(12) United States Patent
Buckley

(10) Patent No.: US 7,085,552 B2
(45) Date of Patent: Aug. 1, 2006

(54) DISPATCHER FOR WIRELESS DEVICE APPLICATIONS

(75) Inventor: David J. Buckley, Jamul, CA (US)

(73) Assignee: Motricity, Inc., Durham, NC (US)

( * ) Notice: Subject to any disclaimer, the term of this patent is extended or adjusted under 35 U.S.C. 154(b) by 181 days.

(21) Appl. No.: 10/643,636

(22) Filed: Aug. 18, 2003

(65) Prior Publication Data

US 2005/0054330 A1    Mar. 10, 2005

(51) Int. Cl.
*H04L 12/58* (2006.01)

(52) U.S. Cl. ............... 455/412.1; 455/412.2; 455/414.1

(58) Field of Classification Search ............ 455/412.1, 455/412.2, 414.1, 418, 419, 426.1, 425, 555, 455/552.1; 370/466, 467; 702/188
See application file for complete search history.

(56) References Cited

U.S. PATENT DOCUMENTS

| | | | |
|---|---|---|---|
| 6,272,333 B1 * | 8/2001 | Smith ..................... | 455/418 |
| 6,404,775 B1 * | 6/2002 | Leslie et al. ............... | 370/466 |
| 6,690,923 B1 * | 2/2004 | Ortiz Perez et al. ....... | 455/74.1 |
| 6,826,405 B1 * | 11/2004 | Doviak et al. ............ | 455/445 |
| 2002/0068573 A1 * | 6/2002 | Raverdy et al. ........... | 455/445 |
| 2002/0119803 A1 * | 8/2002 | Bitterlich et al. .......... | 455/552 |
| 2003/0090528 A1 * | 5/2003 | Masuda et al. ............ | 345/838 |
| 2003/0158708 A1 * | 8/2003 | Frost et al. ................ | 702/188 |

* cited by examiner

*Primary Examiner*—Joseph Feild
*Assistant Examiner*—Huy D. Nguyen
(74) *Attorney, Agent, or Firm*—Womble Carlyle Sandridge & Rice, PLLC; Jeffrey R. McFadden

(57) ABSTRACT

A method for handling messages between wireless devices in a network, includes: receiving a message for a device application by a dispatcher application on a receiving wireless device; determining that the device application does not exist on the receiving wireless device by the dispatcher application; and sending a notification to a user of the receiving wireless device of receipt of the message. Because the dispatcher application on the receiving wireless device sends this notification, the developer of the device application has an opportunity to sell the device application to the user, and the user has the opportunity to purchase the device application.

34 Claims, 5 Drawing Sheets

DISPATCHER FOR WIRELESS DEVICE APPLICATIONS

FIELD OF THE INVENTION

The present invention relates to wireless devices, and more particularly, to the handling of applications on wireless devices.

BACKGROUND OF THE INVENTION

The ability of wireless devices, such as cellular phones and personal digital assistants, to run software applications is well known in the art. FIG. 1 illustrates a conventional wireless device network. The network 108 includes a sending wireless devices 102 and 110. Both wireless devices 102 and 110 are capable of running a device application 106. The device application 106 can run on a number of application platforms, such as the Binary Runtime Environment for Wireless (BREW™) platform from Qualcomm Incorporated™. The wireless device 102 can send messages to the wireless device 110 via the network 108. The receiving wireless device 110 further includes a trash bin 116 and may or may not include the device application 106.

FIG. 2 is a flowchart illustrating a conventional method of handling messages between wireless devices in the network. First, the sending wireless device 102 sends a message for a device application 106 to the receiving wireless device 110 in the network 108, via step 202. The application platform 104 on the receiving wireless device 110 receives the message, and determines if the device application 106 exists on the device 110, via step 204. If the device application 106 exists on the receiving wireless device 110, the message is delivered to it, via step 206. However, if the device application 106 does not exist on the receiving wireless device 110, the message is discarded by placing it in the trash bin 116 on the receiving wireless device 110, via step 208.

For example, assume that the device application 106 is a chess application. The user of the sending wireless device 102 sends a message containing a request to begin a chess game. The message is then sent to the receiving wireless device 110 via the network 108, via step 202. The applications platform 104 of the receiving wireless device 110 determines if the chess application exists on the device 110, via step 204. If it does exist, then the message is delivered to the chess application, via step 206. The user of the receiving wireless device 110 can then be notified that a message for the chess application has been received. If the chess application does not exist on the receiving wireless device 110, then the application platform 104 discards the message by placing it in the trash bin 116, via step 208.

However, in discarding messages in this manner, the user of the receiving wireless device 110 is not made aware of messages received that pertained to device applications not on the wireless device 110. Thus, an opportunity for the application developer to sell the device application 106 to the user of the receiving wireless device 110, and for the user to purchase the device application 106, is lost.

Accordingly, there exists a need for an improved method of handling messages between wireless devices in a network. The improved method should notify a user of a wireless device that a message is received that pertained to a device application not on the wireless device. The user can then be given the opportunity to purchase this device application. The present invention addresses such a need.

SUMMARY OF THE INVENTION

A method for handling messages between wireless devices in a network, includes: receiving a message for a device application by a dispatcher application on a receiving wireless device; determining that the device application does not exist on the receiving wireless device by the dispatcher application; and sending a notification to a user of the receiving wireless device of receipt of the message. Because the dispatcher application on the receiving wireless device sends this notification, the developer of the device application has an opportunity to sell the device application to the user, and the user has the opportunity to purchase the device application.

DETAILED DESCRIPTION

The present invention provides an improved method of handling messages between wireless devices in a network. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 3 through 5 in conjunction with the discussion below.

Figure 3:
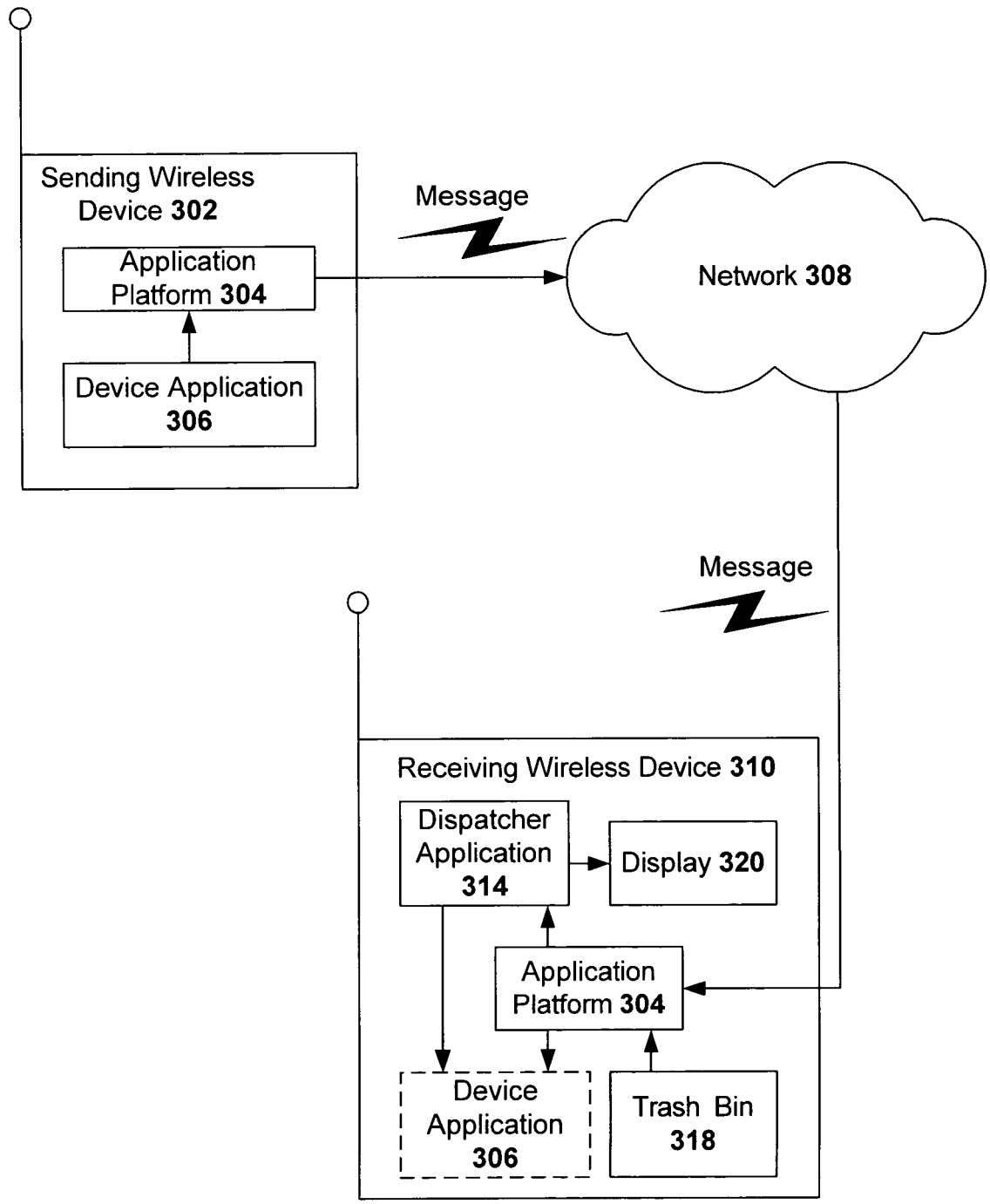
FIG. 3 illustrates a preferred embodiment of a network utilizing the method of handling messages between wireless devices in accordance with the present invention.

FIG. 3 illustrates a preferred embodiment of a network utilizing the method of handling messages between wireless devices in accordance with the present invention. The network 308 comprises a sending wireless device 302 and a receiving wireless device 310. Both the sending wireless device 302 and the receiving wireless device 310 has an application platform 304 on which a device application 306 can run. In the preferred embodiment, the receiving wireless device 310 further comprises a dispatcher application 314, a display 320, and a trash bin 318. The device application 306 may or may not exist on the receiving wireless device 310. The dispatcher application 314 is software that implements the method of handling messages in accordance with the present invention, as illustrated in FIG. 4.

Figure 4:
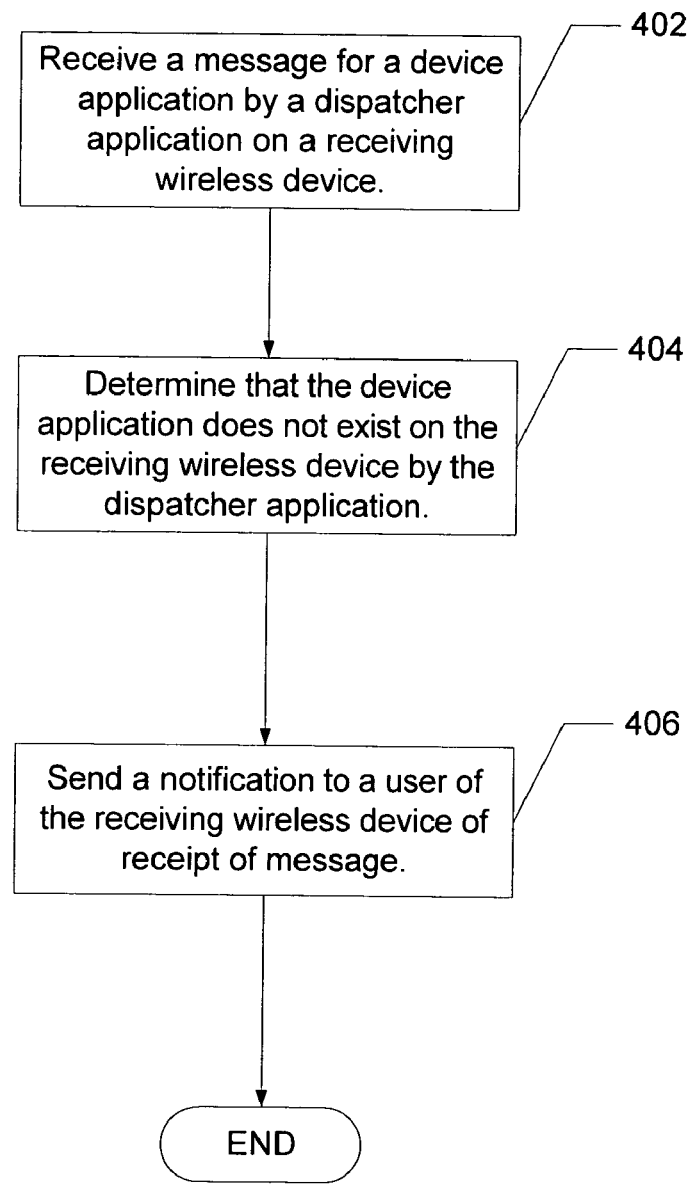
FIG. 4 is a flowchart illustrating a preferred embodiment of the method of handling messages between wireless devices in accordance with the present invention.

FIG. 4 is a flowchart illustrating a preferred embodiment of the method of handling messages between wireless devices in accordance with the present invention. Referring to both FIGS. 3 and 4, first, a message for the device application 306 is received by the dispatcher application 314 on the receiving wireless device 402. In the preferred embodiment, the message is sent by the sending wireless device 302, via the network 308, and first received by the application platform 304 on the receiving wireless device 310. The application platform 304 on the receiving wireless device 310 determines that the message is for the dispatcher application 314 and delivers the message to it. Upon receiving the message, the dispatcher application 314 determines if the device application 306 exists on the receiving wireless device 310, via step 404. If the dispatcher application 314 determines that the device application 306 does not exist on the receiving wireless device 310 of the receipt of the message, then a notification is sent to the user of the device 310, via step 406. In the preferred embodiment, the notification can be a ring, a vibration, or some other notification method. The dispatcher application 314, via a graphical user interface on the display 320 of the receiving wireless device 310, can then direct the user to a location on the network 308 at which the user may purchase the device application 306.

Figure 1:
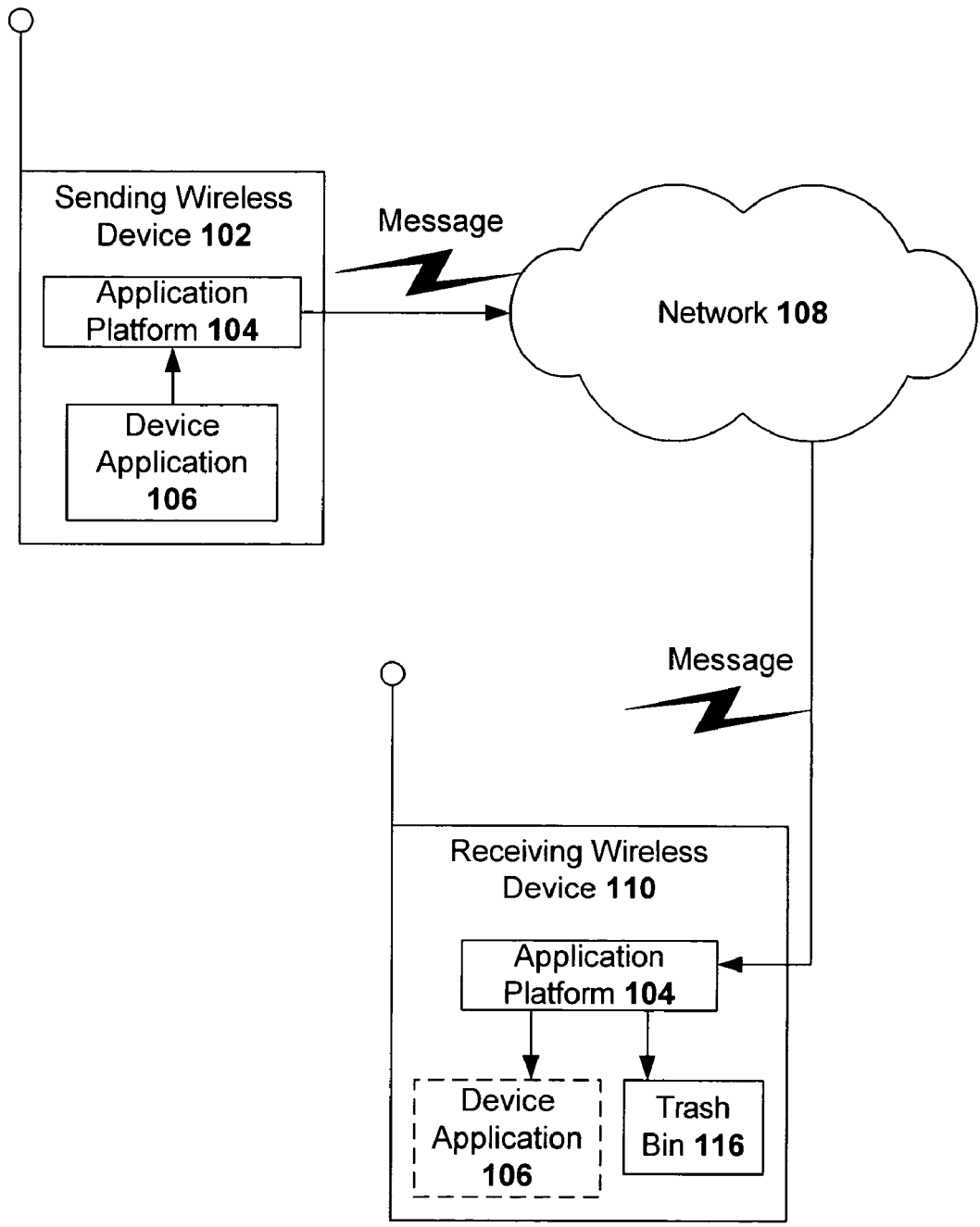
FIG. 1 illustrates a conventional wireless device network.
Figure 2:
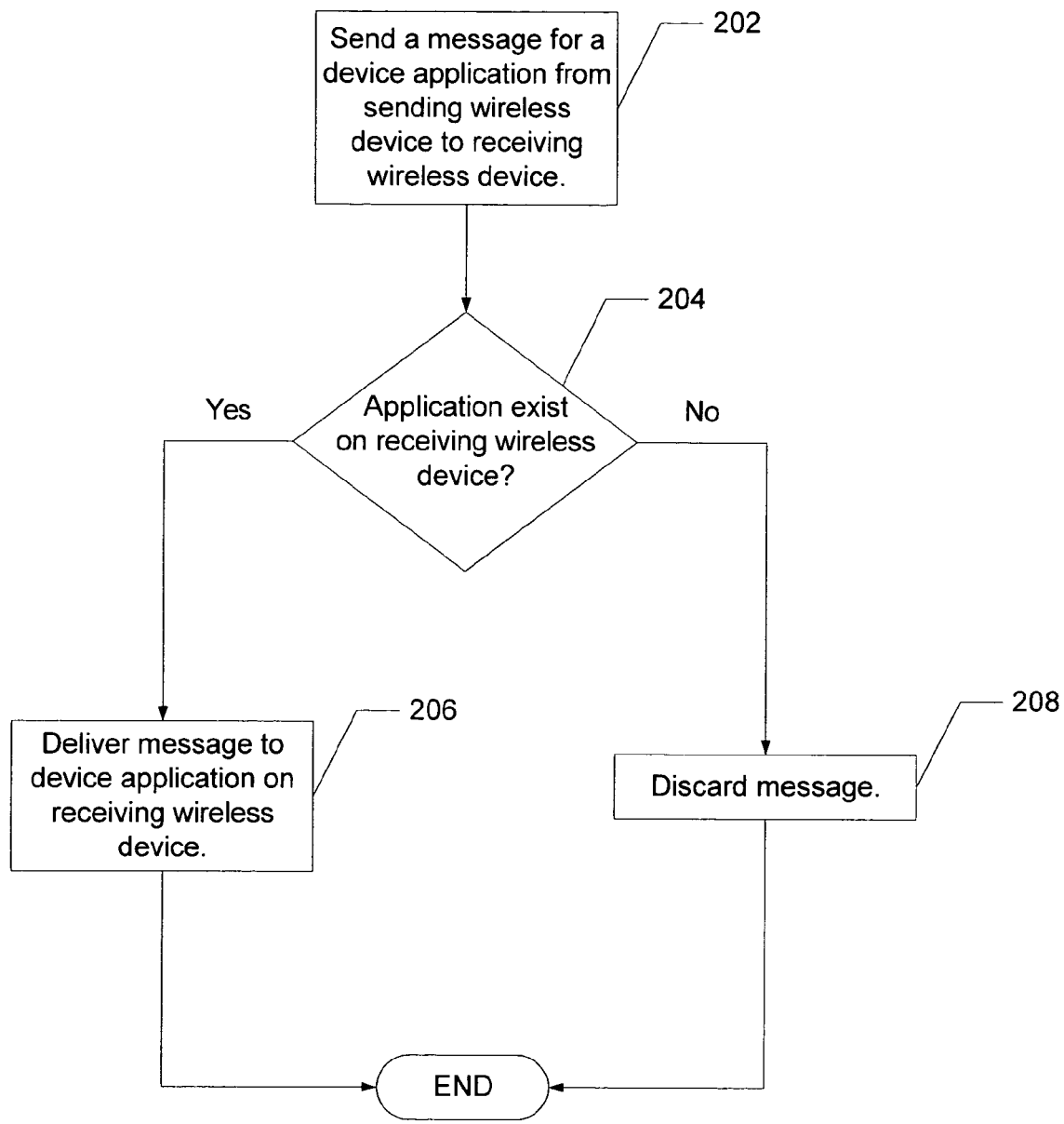
FIG. 2 is a flowchart illustrating a conventional method of handling messages between wireless devices in the network.
Figure 5:
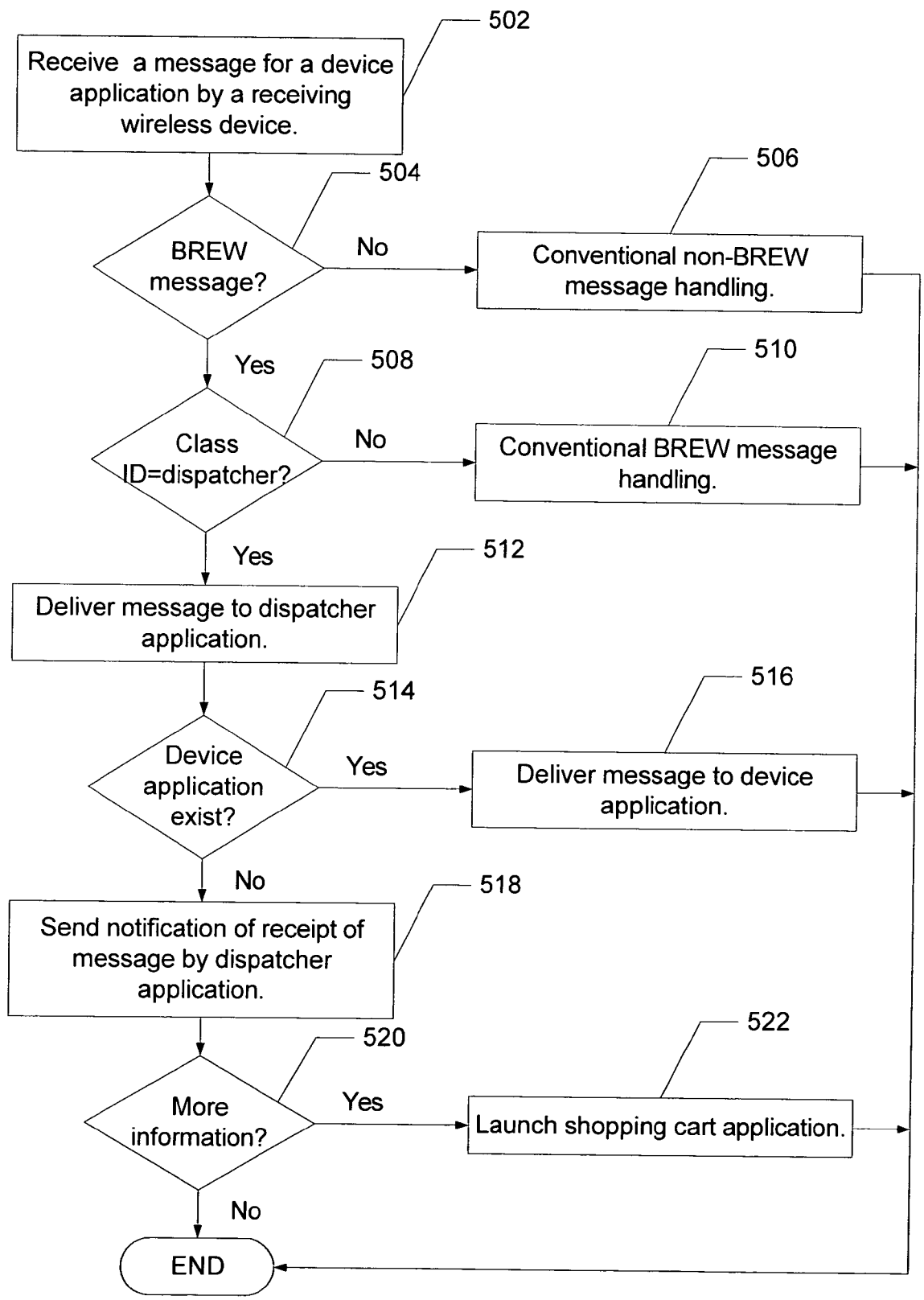
FIG. 5 is a flowchart illustrating in more detail the method of handling messages between wireless devices in accordance with the present invention.

FIG. 5 is a flowchart illustrating in more detail the method of handling messages between wireless devices in accordance with the present invention. First, a message for the device application 306 is received by the application platform 304 of the receiving wireless device 310, via step 502. Assume that the application platform 304 is the BREW platform. The BREW platform then determines if the message is a BREW message, via step 504. To be a BREW message, the message must have the following format: \\BREW:ClassID:FreeFormText. The ClassID portion of the message contains the application identifier. The FreeFormText portion of the message contains any other information to be passed to the identified application. If the message is not a BREW message, then conventional non-BREW message handling is performed, via step 506. If the message is a BREW message, the application platform 304 on the receiving wireless device determines if the ClassID identifies the dispatcher application 314, via step 508. If not, then conventional BREW message handling is performed, via step 510, described above with reference to FIG. 2.

If the ClassID identifies the dispatcher application 314, the message is delivered to the dispatcher application 314, via step 512. The dispatcher application 314 then examines the FreeFormText portion of the message to determine the identity of the device application 306 to which the message is intended. The dispatcher application 314 next determines if the device application 306 exists on the receiving wireless device 310, via step 514. If it does exist, then the message is delivered to the device application 306, via step 516. If it does not exist, then the dispatcher application 314 sends a notification of receipt of the message to the user, via step 518. The notification can be a ring or vibration or a visual notification on the display 320 of the receiving wireless device 310. In the preferred embodiment, the notification comprises a graphical user interface on the display 320 that gives the user of the receiving wireless device 310 the option to obtain more information about the device application 314. If the user selects to obtain more information, via step 520, then the dispatcher application 314 launches a shopping cart application, via step 522. Through the shopping cart application, the user can obtain information concerning the device application 306 and choose to purchase it. The dispatcher application 314 can either take the user to the beginning menu of the shopping cart application, or take the user directly to the menu for the device application 306.

In the preferred embodiment, for the sending wireless device 302 to utilize the present invention, it first sends the message to a server (not shown) in the network 308. The server then reformats the message so that the dispatcher application 314 is identified in the ClassID portion, and the identity of the device application 306 is placed in the FreeFormText portion. The server then sends the reformatted message to the receiving wireless device 310.

For example, assume that the application platform 304 is the BREW platform, that the identifier for the dispatcher application is DispatcherAppID, and that the device application 306 is a chess application with the identifier, ChessAppID. A user of the sending wireless device 302 prepares a message for the user of the receiving wireless device 310 to request the start of a new chess game. Assume that the chess application does not exist on the receiving wireless device 310. The message is first sent to a server in the network 308, which reformats the message to the following: \\BREW:DispatcherAppID: . . . ChessAppID . . . The server then sends this reformatted message to the receiving wireless device 310.

When the receiving wireless device 310 receives this reformatted message, via step 502, it determines that the message is in the BREW format, via step 504. The BREW platform determines that DispatcherAppID identifies the dispatcher application 314, via step 508. The message is then delivered to the dispatcher application 314, via step 512. From the identifier, ChessAppID, the dispatcher application 314 determines that the message is intended for the chess application. The dispatcher application 314 then determines that the chess application does not exist on the receiving wireless device 310, via step 514, and sends a notification of receipt of the message to the user of the receiving wireless device 310, via step 518. For example, if the receiving wireless device 310 is a mobile phone, ring tones are made to sound. The dispatcher application 314 places on the display 320 of the receiving wireless device 310 a graphical user interface that includes text informing the user of the message and that the chess application to which the message was intended does not exist on the device 310. The interface can give the user a choice to launch the shopping cart application, via step 520. Assume that the user chooses to launch the shopping cart application, via step 522. Through the shopping cart application, the user has the opportunity to purchase the chess application, download it to the receiving wireless device 310, and execute the chess application.

Although the present invention has been described above in the context of BREW and mobile phones, one of ordinary skill in the art will understand that other application platforms or devices may be used without departing from the spirit and scope of the present invention.

An improved method of handling messages between wireless devices has been disclosed. The method includes receiving a message for a device application by a dispatcher application on the receiving wireless device, determining that the device application does not exist on the receiving wireless device by the dispatcher application, and sending a notification to a user of the receiving wireless device of the receipt of the message. Because the dispatcher application on the receiving wireless device sends this notification, the developer of the device application has an opportunity to sell the device application to the user, and the user has the opportunity to purchase the device application.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for handling messages between devices in a network, comprising the steps of:
   (a) receiving a message for a device application by a dispatcher application, wherein the dispatcher application resides on a receiving wireless device, comprising the steps of:
      (a1) receiving the message by the receiving wireless device;
      (a2) determining if the message identifies the dispatcher application; and
      (a3) delivering the message to the dispatcher application if the message identifies the dispatcher application;
   (b) determining that the device application does not exist on the receiving wireless device by the dispatcher application; and
   (c) sending a notification to a user of the receiving wireless device of receipt of the message.

2. The method of claim 1, wherein the determining step (a2) comprises:
   (a2i) performing conventional message handling if the message does not identify the dispatcher application.

3. The method of claim 1, wherein the receiving step (a1) comprises:
   (a1i) determining if the message is in a BREW platform format;
   (a1ii) performing conventional non-BREW message handling if the message is not in the BREW platform format.

4. The method of claim 1, wherein the determining step (b) comprises:
   (b1) determining an identity of the device application from the message by the dispatcher application; and
   (b2) determining if the device application exists on the receiving wireless device.

5. The method of claim 4, further comprising:
   (b3) delivering the message to the device application if the device application exists on the receiving wireless device.

6. The method of claim 1, further comprising:
   (d) providing an option to obtain information on the device application.

7. The method of claim 6, wherein the providing step (d) comprises:
   (d1) launching a shopping cart application if a selection to obtain the information is received.

8. A method for handling messages between wireless devices in a network, comprising the steps of:
   (a) receiving the message by the receiving wireless device;
   (b) determining if the message identifies the dispatcher application;
   (c) delivering the message to the dispatcher application if the message identifies the dispatcher application;
   (d) determining that a device application does not exist on the receiving wireless device by the dispatcher application; and
   (e) sending a notification to a user of the receiving wireless device of receipt of the message.

9. The method of claim 8, wherein the determining step (b) comprises:
   (b1) performing conventional message handling if the message does not identify the dispatcher application.

10. The method of claim 8, wherein the receiving step (a) comprises:
    (a1) determining if the message is in a BREW platform format;
    (a2) performing conventional non-BREW message handling if the message is not in the BREW platform format.

11. The method of claim 8, wherein the determining step (d) comprises:
    (d1) determining an identity of the device application from the message by the dispatcher application; and
    (d2) determining if the device application exists on the receiving wireless device.

12. The method of claim 11, further comprising:
    (d3) delivering the message to the device application if the device application exists on the receiving wireless device.

13. The method of claim 8, further comprising:
    (f) providing an option to obtain information on the device application.

14. The method of claim 13, wherein the providing step (f) comprises:
    (f1) launching a shopping cart application if a selection to obtain the information is received.

15. A method for handling messages between wireless devices in a network, comprising the steps of:
    (a) receiving a message by a receiving wireless device;
    (b) determining if the message identifies a dispatcher application on the receiving wireless device;
    (c) delivering the message to the dispatcher application if the message identifies the dispatcher application;
    (d) determining an identity of a device application from the message by the dispatcher application;
    (e) determining if the device application exists on the receiving wireless device; and
    (f) sending a notification to a user of the receiving wireless device of receipt of the message, if the device application does not exist on the receiving wireless device.

16. The method of claim 15, further comprising:
    (g) providing an option to obtain information on the device application, if the device application does not exist on the receiving wireless device.

17. The method of claim 16, wherein the providing step (g) comprises:
    (g1) launching a shopping cart application if a selection to obtain the information is received.

18. A computer readable medium with program instructions for handling messages between devices in a network, comprising the instructions for:
    (a) receiving a message for a device application by a dispatcher application, wherein the dispatcher application resides on a receiving wireless device, wherein the receiving instruction (a) comprises instructions for:
       (a1) receiving the message by the receiving wireless device;
       (a2) determining if the message identifies the dispatcher application;
       (a3) delivering the message to the dispatcher application if the message identifies the dispatcher application.
    (b) determining that the device application does not exist on the receiving wireless device by the dispatcher application; and
    (c) sending a notification to a user of the receiving wireless device of receipt of the message.

19. The medium of claim 18, wherein the determining instruction (a2) comprises instructions for:

(a2i) performing conventional message handling if the message does not identify the dispatcher application.

20. The medium of claim 18, wherein the receiving instruction (a1) comprises the instructions for:
(a1i) determining if the message is in a BREW platform format;
(a1ii) performing conventional non-BREW message handling if the message is not in the BREW platform format.

21. The medium of claim 18, wherein the determining instruction (b) comprises the instructions for:
(b1) determining an identity of the device application from the message by the dispatcher application; and
(b2) determining if the device application exists on the receiving wireless device.

22. The medium of claim 21, further comprising instructions for:
(b3) delivering the message to the device application if the device application exists on the receiving wireless device.

23. The medium of claim 18, further comprising instructions for:
(d) providing an option to obtain information on the device application.

24. The medium of claim 23, wherein the providing instruction (d) comprises instructions for:
(d1) launching a shopping cart application if a selection to obtain the information is received.

25. A computer readable medium with program instructions for handling messages between wireless devices in a network, comprising the instructions for:
(a) receiving the message by the receiving wireless device;
(b) determining if the message identifies the dispatcher application;
(c) delivering the message to the dispatcher application if the message identifies the dispatcher application;
(d) determining that a device application does not exist on the receiving wireless device by the dispatcher application; and
(e) sending a notification to a user of the receiving wireless device of receipt of the message.

26. The medium of claim 25, wherein the determining instruction (b) comprises the instructions for:
(b1) performing conventional message handling if the message does not identify the dispatcher application.

27. The medium of claim 25, wherein the receiving instruction (a) comprises the instructions for:
(a1) determining if the message is in a BREW platform format;
(a2) performing conventional non-BREW message handling if the message is not in the BREW platform format.

28. The medium of claim 25, wherein the determining instruction (d) comprises instructions for:
(d1) determining an identity of the device application from the message by the dispatcher application; and
(d2) determining if the device application exists on the receiving wireless device.

29. The medium of claim 28, further comprising instructions for:
(d3) delivering the message to the device application if the device application exists on the receiving wireless device.

30. The medium of claim 25, further comprising instructions for:
(f) providing an option to obtain information on the device application.

31. The medium of claim 30, wherein the providing instruction (f) comprises instructions for:
(f1) launching a shopping cart application if a selection to obtain the information is received.

32. A computer readable medium with program instructions for handling messages between wireless devices in a network, comprising the instructions for:
(a) receiving a message by a receiving wireless device;
(b) determining if the message identifies a dispatcher application on the receiving wireless device;
(c) delivering the message to the dispatcher application if the message identifies the dispatcher application;
(d) determining an identity of a device application from the message by the dispatcher application;
(e) determining if the device application exists on the receiving wireless device; and
(f) sending a notification to a user of the receiving wireless device of receipt of the message, if the device application does not exist on the receiving wireless device.

33. The medium of claim 32, further comprising instructions for:
(g) providing an option to obtain information on the device application, if the device application does not exist on the receiving wireless device.

34. The medium of claim 33, wherein the providing instruction (g) comprises instructions for:
(g1) launching a shopping cart application if a selection to obtain the information is received.

\* \* \* \* \*